Feb. 7, 1933. E. A. ROCKWELL 1,896,376
LINKAGE CONTROL FOR POWER BRAKES
Filed Jan. 18, 1930 4 Sheets-Sheet 3

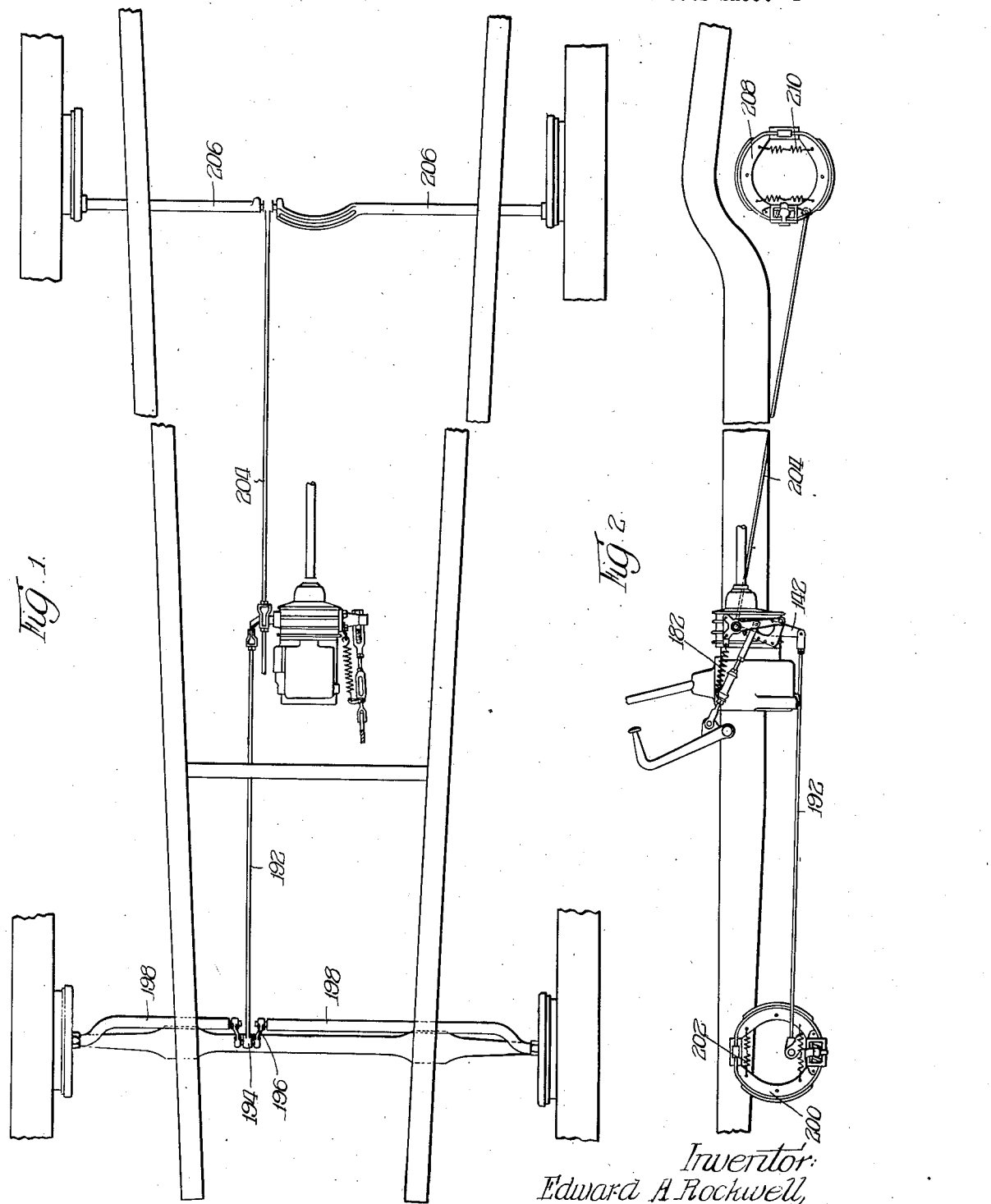

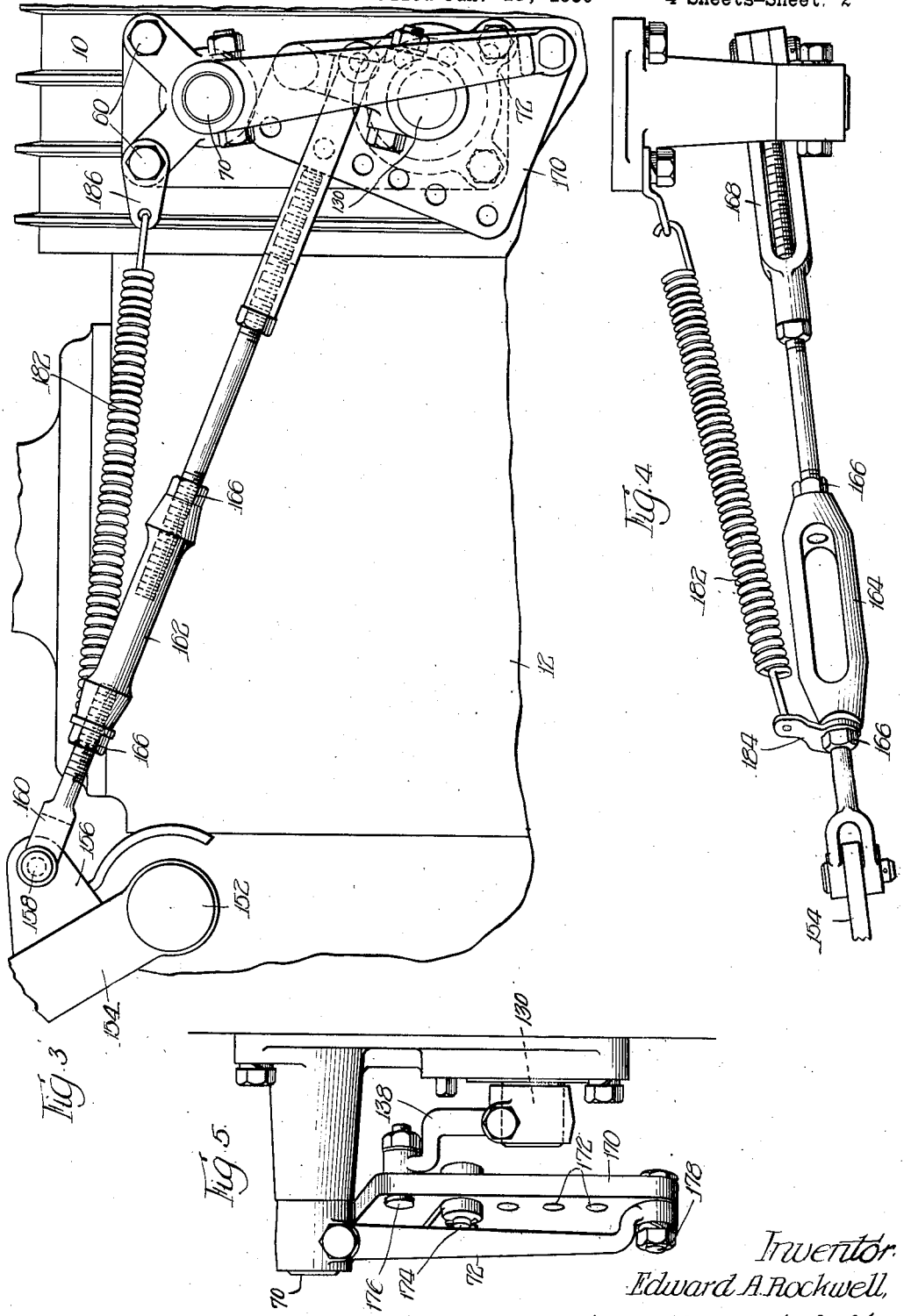

Inventor:
Edward A. Rockwell,

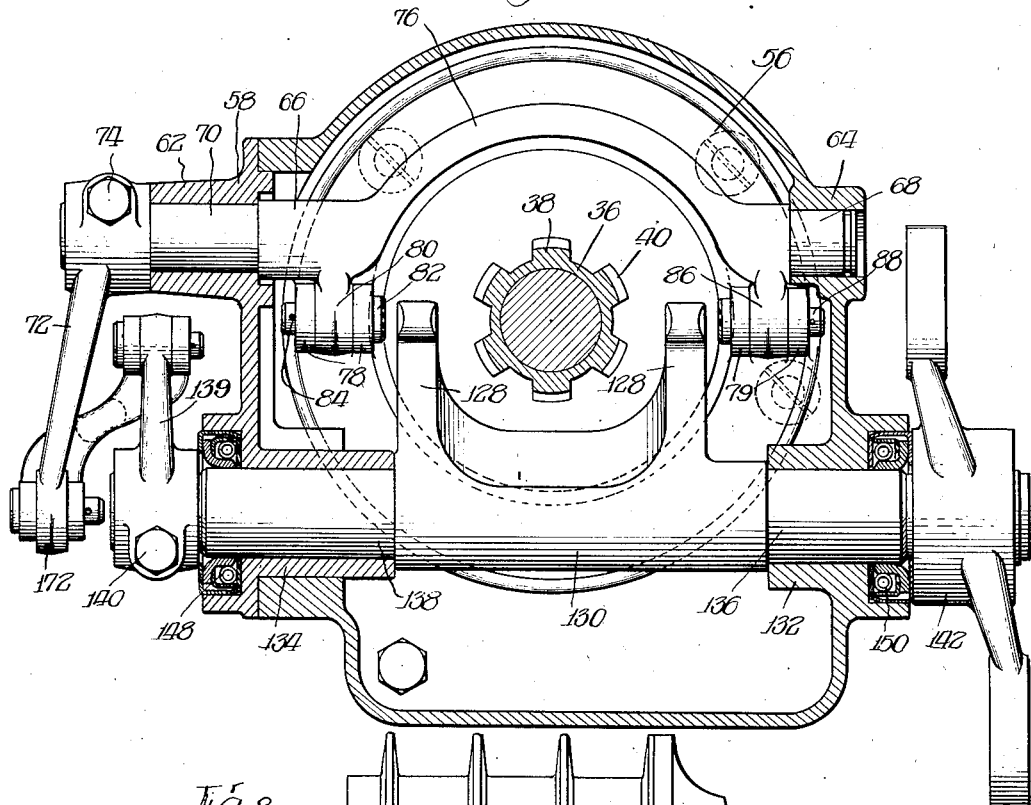

Patented Feb. 7, 1933

1,896,376

UNITED STATES PATENT OFFICE

EDWARD A. ROCKWELL, OF CHICAGO, ILLINOIS

LINKAGE CONTROL FOR POWER BRAKES

Application filed January 18, 1930. Serial No. 421,709.

This invention relates to improvements in brake linkage, especially designed to be used in connection with power brakes. More particularly the invention comprises the design of linkage which is moved by a manually operable member such as a pedal to bring the power brake into action.

Power brakes of the class to which the present invention applies have been developed and used primarily in connection with motor vehicles. Thus the power brake is associated with the propeller shaft of the vehicle generally immediately in rear of the transmission. The usual wheel brakes are utilized and the linkage connections are so designed that the operator by movement of the pedal may bring the power brake into action whereupon the wheel brakes will be pulled on assisted by the rotation of the propeller shaft and the movement of the vehicle. The braking torque developed in the power brake is partly dissipated in acting as a fifth brake for the vehicle, if front wheel and rear wheel brakes are used, and part is utilized as energy to apply the wheel brakes. The construction, however, is not self-energizing, that is, rotation of the propeller shaft does not assist in forcing the brake elements of the power brake into engagement. As one class of power brake there may be mentioned the ordinary slipping clutch type in which one clutch member is positively driven by the propeller shaft while the other clutch member is normally stationary but may be moved axially into engagement with the rotating clutch member. When the frictional engagement occurs the driving clutch member tends to turn the normally stationary clutch member and the relative movement of said clutch member with respect to the propeller shaft through suitable cams or other means transmits movement to the linkage connecting to the wheel brakes. In the second class of power brakes to which the present invention is more applicable the braking reaction is taken against a stationary part and a portion of the braking torque is utilized in retarding a member which normally rotates with the power shaft whereby the relative movement between the normally rotatable member and the propeller shaft will pull on the wheel brakes. Such classes of power brakes may be operated by relatively light pedal pressures since the pedal only serves to bring the braking elements into engagement. Provision must therefore be made for preventing over application of the wheel brakes which might result in locking the brakes. In my previously filed application, Serial No. 365,071, filed May 22, 1929, I have shown a dash pot associated with the output member of the power brake which prevents an undesirably rapid application of the wheel brakes and serves to absorb shocks and render the application of the braking force to the wheel brakes more even and uniform. Also in my previously filed application, Serial No. 365,070, filed May 22, 1929, I have shown a pedal operated linkage which serves to modulate the pressure applied to the input member of the power brake unit. The present invention is concerned with other means for accomplishing substantially similar results.

It is the purpose of the present invention to provide manually operable linkage so connected to the power brake unit that the initial pedal movement will bring the braking elements in the power brake into engagement whereupon actuation of the power brake, causing movement of the output member will tend to decrease the effective pressure supplied by the input member. Thus if a heavy pressure is initially applied to the pedal the actuation of the power brake unit will bring about a release by decreasing the input pressure. However, if the operator desires to bring the car to a sudden stop further movement of the pedal will accomplish the purpose.

It is further a purpose of the present invention to provide linkage such as above described which may be used to pull on the wheel brakes even though the driven shaft with which the power brake is associated is not rotated—such as for instance when the vehicle is not in motion.

Particular features of the present invention comprise the provision of a coupling member which is pivotally connected to the output and input lever arms of the power brake unit and is also pivotally connected to the pedal linkage. Also it is my intention to use pull back springs for the wheel brake linkage which are relatively stronger than the return springs for the pedal linkage, thus permitting the initial movement of the pedal to bring the power brake into action and not the wheel brakes.

Additional objects and advantages of the present invention will be more readily apparent as the invention is more fully described in connection with the attached drawings in which preferred embodiments of my invention are illustrated.

In the drawings:

Figure 1 is a diagrammatic layout in plan illustrating the arrangement of the brake linkage with respect to a vehicle chassis;

Figure 2 is a side elevation of the layout shown in Figure 1;

Figure 3 is an enlarged side elevation illustrating the improved linkage associated with a power brake;

Figure 4 is a top plan view of a portion of Figure 3;

Figure 5 is an end view taken from the right hand side of the linkage shown in Figure 4;

Figure 7 is a transverse section through the power brake housing and illustrating a modified form of coupling member to which the pedal linkage is connected; and Figure 8 is a side elevation illustrating the association of the coupling member shown in Figure 6 with the power brake casing.

Figure 6:
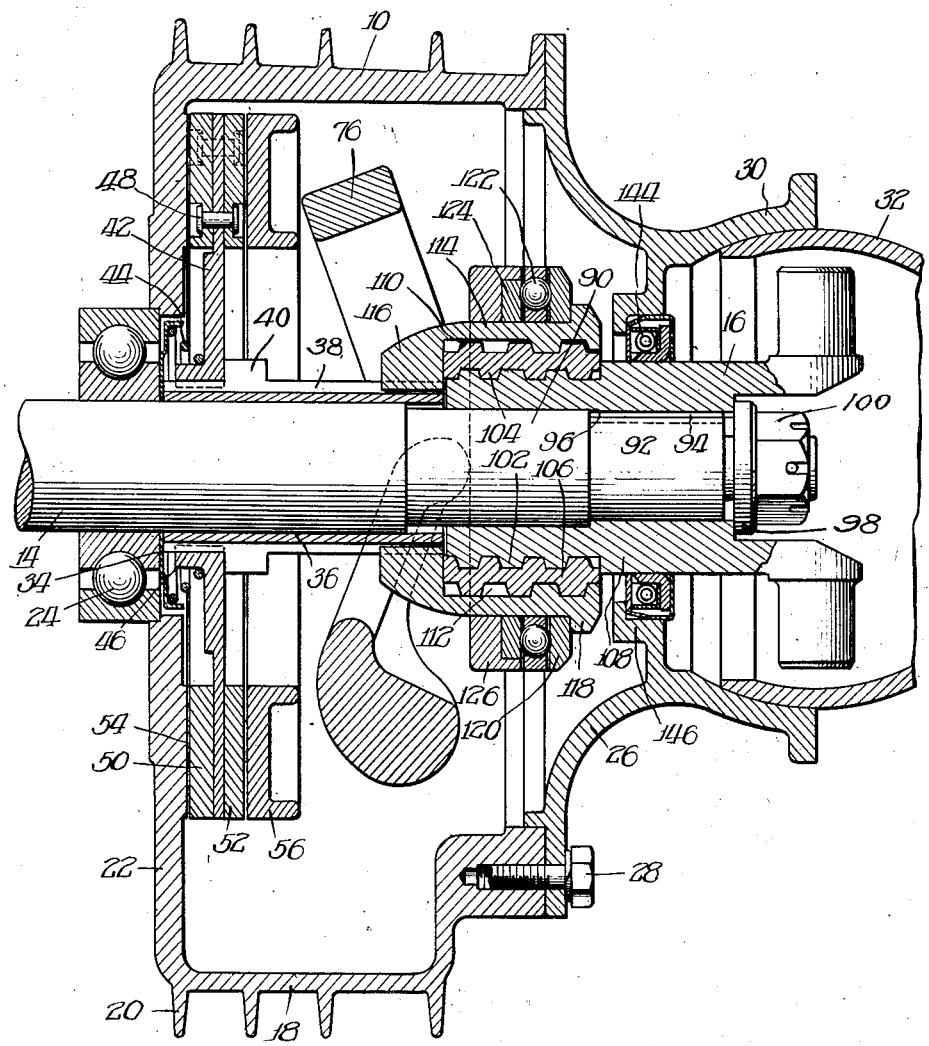
Figure 6 is a longitudinal section through a power brake housing.

It will be understood that previous improvements have disclosed the use of a power brake unit which is so associated with the propeller shaft of the vehicle that the operator by controlling the braking torque in the power brake unit may correspondingly control the application of the braking force to the wheel brakes of the vehicle. For the purpose of the present disclosure I have shown a power brake unit comprising the housing 10 which is mounted immediately in rear of the transmission housing 12 as shown in Figure 2. The housing and casing 10 may be bolted or otherwise secured to the casing 12 or in fact it may be formed integral with the casing 12. As shown in Figure 6, the transmission or propeller shaft 14 extends rearwardly from the transmission casing and as is customary is provided with a keyed yoke member 16 forming one portion of the universal joint connection to the shaft which runs to the differential. The power brake housing which has been generally designated 10 may comprise a drum 18 having the cooling ribs 20 outwardly extending from the cylindrical portion of the drum. The flange 22 seats against a thrust bearing 24 which is mounted on the propeller shaft 14. The rear open side of the drum casing 18 is closed by the flanged cover 26 which is held by the bolts 28 to the drum 18. The cover 26 may include a partly spherical portion 30 which receives the ball shaped end 32 of the torque tube. Immediately in rear of the thrust bearing 24 a ring shaped spring seat 34 is mounted and held by the end of a sleeve 36 which is rotatably mounted on the shaft 14. The sleeve 36 is provided with longitudinal splines 38 on its exterior intermediate portions 40 of which are higher than the remainder of the splines and serve as stop members in the manner to be described. Carried on the splines of sleeve 36 and slidable between the stop portions 40 and the thrust bearing 24 is a brake disk 42 which as will be described is normally rotatable with the shaft 14 but is retardable with respect thereto. The brake disk 42 is resiliently urged rearwardly into engagement with the stop portions 40 by the provision of the coiled spring 44 which extends between the spring seat ring 34 and the corner between the collar 46 and the flange of the brake disk. Secured to opposite faces of the brake disk 42 and held by the rivets 48 are the lining rings 50 and 52 of friction material which may be of suitable composition or compound. The lining 50 is upon movement of the brake disk forced into engagement with the annular machined surfaces 54 of the flange 22 of the fixed drum 18, while the lining 52 on the opposite side of the brake disk cooperates with the brake ring 56 which comprises a ring having a channel shaped section as clearly shown in Figure 6.

One side of the casing 10 is formed with an opening which may be closed by the bearing plate 58 as shown in Figure 7. The plate 58 is held to the drum 18 by the bolts 60. The bearing plate 58 is formed with an outwardly extending bearing 62 while the opposite side of the casing 10 is formed with the bearing 64. The bearings 62 and 64 provide a mounting for a transverse rock shaft 66 which constitutes the input actuating member. The rock shaft 66 includes a cylindrical end 68 fitting into the bearing 64 and an outwardly extending cylindrical end 70 to which may be attached a depending lever arm 72 secured to the rock shaft by the bolt 74. The middle portion of the rock shaft is upwardly curved as at 76 out of the way of the splined sleeve 36. The rock shaft provides a mounting and an actuating means for the brake ring 56 and as shown the brake ring is provided at its horizontal diameter with two pair of spaced ears 78 and 79. The ears 78 receive therebetween an eye portion 80 formed integral with the rock shaft and a pivotal connection is provided by the pin 82 having an enlarged head at one end and secured by a cotter pin 84 at the other end while an eye 86 is similarly received between the spaced ears 79 and pivotally secured thereto by the pin 88.

It will be readily understood that an operative movement of the lever arm 72 will move the brake ring 56 axially with respect to the shaft 14 and force the normally rotatable brake disk 42 into engagement with the fixed housing against the resistance of the spring 44. The braking torque developed will tend to retard the brake disk 42 relative to the rotation of the shaft 14 and this relative movement is taken advantage of to impart a pull to the linkage which extends to the wheel brakes of the vehicle.

The shaft 14 is reduced from the cylindrical portion which carries the splined sleeve 36 to the cylindrical portion 90 and is again reduced at the portion 92 which is further provided with splines 94. Thus a shoulder 96 is formed between portions 92 and 90 of the shaft 14 and the yoke 16, when mounted upon the shaft 14, will be forced into engagement with the shoulder 96. The yoke 16 is held in position by the washer 98 and the nut 100. This construction permits a slight clearance between the adjoining ends of the yoke 16 and the splined sleeve 36. The forward end of the yoke 16 is formed with an external right-hand spiral thread 102 which cooperates with an internal right-hand spiral thread 104 of the intermediate sleeve 106. The rearward end of the sleeve 106 will cooperate in stop position with a shoulder 108 of the yoke 16 which thereby limits the rearward movement of the sleeve. The sleeve 106 is externally threaded with a left-hand thread 110 which cooperates with an internal left-hand thread 112 formed in a collar 114. The forward end of the collar 114 inwardly extends as at 116 and is formed to engage the straight splines of the sleeve 36. The portion 116 of the collar also serves as a stop to prevent further rearward movement of the collar 114 by engaging the forward end of the intermediate sleeve 106.

From the construction so far described it will be apparent that a clockwise rotation of the shaft 14 as seen from the left hand end in Figure 6 such as during the forward movement of the vehicle will tend to rotate the yoke 16, which is carried thereon, in a clockwise direction. The clockwise rotation of the yoke 16 will tend through the cooperating right-hand spiral threads to force the intermediate sleeve 106 forwardly but this movement is prevented by resisting pull-back springs to be later described. Therefore the sleeve 106 will be rotated positively in a clockwise direction and will tend to move the sleeve and collar 114 through the cooperating left-hand spiral threads in a rearward direction but this movement is resisted by the shoulder 116 coming into engagement with the end of the sleeve 106. Therefore the splined sleeve 36 will be positively rotated together with the brake disk 42. When a braking torque is imparted to the brake disk 42 due to the movement of the rock shaft 66 the retardation imparted thereto will cause the sleeve 106 to move forwardly carrying with it the collar 114. A similar action will occur if the shaft 14 is rotating in a counter-clockwise direction as for instance when the vehicle is moving backwardly, except that in such case the intermediate sleeve will not be moved with the outer collar. In either case it will be apparent that the collar 114 is axially moved relative to the propeller shaft 14 and by this movement a thrust may be imparted to the wheel brake operating linkage.

It will be understood that the spiral threads are reversible; that is, pull back springs upon the linkage will be sufficient to force the spirals to return to normal position. The outer collar 114 at its rearward end is formed with a shoulder 118 against which is seated a thrust ring 120. A thrust bearing 122 seats against the thrust ring 120 and an additional outer thrust ring is provided as shown at 124. Covering the thrust ring 124 is a ring 126 of softer metal than the thrust ring 124 which is designed to transmit the thrust to the yoke arms 128 of a rock shaft 130 extending transversely to the propeller shaft 14 and below the same.

The casing 10 is formed on one side with a bearing 132 and at the opposite side the bearing plate 58 is formed with a bearing 134 which bearings receive cylindrical portions 136 and 138 respectively of the rock shaft. The ends of the rock shaft 130 extend outside of the housing and to one end on the same side as the lever 72 is attached an upwardly extending lever arm 139 held to the rock shaft by the bolt 140. The opposite end of the rock shaft 130 has mounted thereon a double arm lever 142. In order to hold the rock shafts 66 and 130 in operative positions against axial movement they are formed with shoulders which cooperate with the bearings of the housing and the bearing cap plate 58.

The power brake operative parts are completely and efficiently enclosed and cooling means may be provided by allowing lubricating oil to circulate through the brake housing. Therefore sealing means must be provided and I show in Figure 5 an oil seal unit 144 which is slidable on the yoke 16 and seats in an inwardly extending L-shaped flange 146 of the cover plate 26. Also similar oil sealing units 148 and 150 are held in place at the ends of the lower rock shaft 130. The upper rock shaft bearings need not be sealed since they will be above the lubricant level.

It will be apparent that the operation of the power brake closely corresponds to that disclosed in my previously referred to copending application, Serial No. 365,071. The improvements of the present invention relate to the means for actuating the power brake unit. Thus in my former disclosure a thrust was applied to the input member of the power brake through movement of the pedal linkage. In the present disclosure I show a pedal 154 pivotally mounted on a shaft 152 which is suitably mounted on a fixed part of the engine frame. The pedal includes an extension 156 having mounted therein a pivot pin 158 to which is connected a clevis 160 of an adjustable linkage 162. The linkage 162 may be made adjustable through an ordinary form of turn buckle 164 cooperating with the locking nuts 166. The other end of the linkage 162 has connected thereto a clevis 168. Instead of directly connecting the clevis 168 to the lever arm 72, a coupling plate 170 is provided as in Figure 5 which has a plurality of openings 172 to receive a pivot pin 174 which forms a connection to the clevis 168. The upper part of the coupling plate is connected by the pivot pin 176 to the upwardly extending output lever arm 138 while the depending lever arm 72 is pivotally attached to the coupling plate at the lower portion thereof by the pin and bolt connection 178.

In the operation of the arrangement disclosed in Figures 3, 4 and 5 initial pressure applied to the brake pedal by the operator will produce movement of the input lever and likewise rotation of the input rock shaft 17 to actuate the power brake, since the output rock shaft 130 and output lever 139 will be held against movement by the pressure of the pull-back springs. Thus in Figure 5, the coupling plate 170 will initially fulcrum about its pivotal connection at 176 with the output lever 138. The resistance against movement of the brake ring 56 within the power brake unit is initially very slight and the effective resistance against movement of the output lever 138 is materially greater and therefore the power brake will first come into action. As the power brakes comes into action the output rock shaft 130 is rotated in a counter-clockwise direction, as in Figure 3, and the output lever 139 will move and produce movement of the coupling plate 170 about the pivotal connection 174, which then acts as a fulcrum thereby tending to move the input lever 72 in a direction to release the application of pressure to the brake ring 56, but continued pressure upon the pedal will tend to move the coupling plate as the output lever 139 moves so as to maintain an even pressure upon the input lever 72, and therefore to maintain even input pressure to the power brake. However, an increased pedal pressure is required to obtain this result and therefore over-application of the wheel brakes is prevented.

In Figures 6 and 7 a slightly different form of coupling member is provided and in this modification the coupling member comprises a three arm element 180 which has pivotally connected thereto, as previously disclosed, the input and output lever arms, and the clevis 168 of the pedal operated linkage.

In order to hold the pedal in a released position a spring 182 extends between the connection 184 to the linkage 162 and the connections 186 to a fixed part of the brake housing 18 as shown in Figure 4 while Figure 8 illustrates a modified arrangement of springs. In this figure a strong spring 188 extends from a fixed point to the pivotal connection at the end of arm 138 while a weaker spring 190 connects to the input arm 72.

Figures 1 and 2 illustrate the arrangement of the apparatus according to the embodiment of Figures 3, 4 and 5 in association with a vehicle chassis. The double arm lever 142 has connected to its lower extension a forwardly extending brake rod 192 which is connected as at 194 to arms 196 secured to the front cross shafts 198 for actuating the internally expanding front wheel brakes 200. The brakes 200 are held in normal inactive position by the pull back springs 202. In a similar manner a rearwardly extending brake rod 204 connects to the upper arm of lever 142 and is arranged to actuate the rear cross shafts 206 which serve to operate the rear wheel internally expanding brakes 208, having pull back springs 210. The spring 182, which holds the pedal in released position, is weaker than the pull back springs 202 and 210 and therefore the initial movement of the pedal will bring the power brake into action and cause an operative movement of the lower rock shaft 130. During the initial movement, the coupling plate 170 as in Figure 3 or the three-armed coupling member 180 as in Figure 8 will be turned about the pivot 176 until the output rock shaft 130 is moved. The rock shaft 130 will be rotated in a counterclockwise direction as in Figures 3 and 8, which movement will move the coupling plate or coupling member in such a manner as to decrease the input pressure applied through the pedal linkage. Therefore the pedal may be further moved to again develop the same braking pressure. It will be understood that these movements will not occur in steps, but the action will be such that as the operator moves the pedal, the power brake and the wheel brakes will be smoothly brought into action without danger of over-application of the brakes.

With the usual constructions of power brakes the wheel brakes cannot be operated by the pedal control unless the vehicle is moving so that the power brake unit is actuated. According to the present invention if the vehicle is stationary movement of the pedal will first move the power brake elements into engagement and then further movement of the pedal will serve to rotate the lower rock shaft, thus transmitting force through the pull rods to operate the wheel brakes. The braking force will be directly developed by the pedal pressure without amplification through operation of the power brake.

I claim:

1. Brake mechanism for vehicles comprising manually pedal controlled linkage, spring means normally holding said linkage in released position, a power brake unit operable by said pedal linkage, linkage output associated with and extending from said power brake unit to auxiliary brakes, spring means stronger than said first mentioned spring means for holding said last named linkage in released position and a coupling member between said linkages.

2. Brake mechanism for motor vehicles comprising power brake mechanism arranged substantially concentric with respect to the propeller shaft of the vehicle, said power braking mechanism including input and output rock shafts arranged respectively above and below the propeller shaft and transverse thereto, means for transmitting operative movement of said output rock shaft to the wheel brakes of the vehicle, an input lever secured to said input rock shaft, an output lever secured to said output rock shaft, a pivoted brake pedal and means for transmitting operative movement from said brake pedal to both said input and output levers in such a manner as to tend to move both said levers in actuating directions.

3. Brake mechanism for motor vehicles comprising power brake mechanism arranged substantially concentric with respect to the propeller shaft of the vehicle, input and output rock shafts associated with said power braking mechanism arranged respectively above and below said propeller shaft and transverse thereto, means for transmitting operative movement of said output rock shaft to the wheel brakes of the vehicle, an input lever secured to one end of said input rock shaft and extending downwardly therefrom, an output lever secured to one end of said output rock shaft and extending upwardly therefrom, a coupling member pivotally connected at its lower portion to said input lever and pivotally connected at its upper portion to said output lever, a pivoted brake pedal and linkage extending from said brake pedal pivotally connected to said coupling member at a point intermediate the upper and lower pivotal connections to said levers.

4. Brake mechanism for motor vehicles comprising power brake mechanism arranged substantially concentric with respect to the power shaft of the vehicle, input and output rock shafts associated with said power brake mechanism arranged respectively above and below said propeller shaft and transverse thereto, a pivoted brake pedal, means for transmitting actuating movement of said pedal to both said input and output rock shafts, means for transmitting movement of said output rock shaft to the wheel brakes of the vehicle, resilient means for normally holding said input rock shaft in released position and resilient means effective with a greater force than said first-mentioned resilient means for holding said output rock shaft in released position.

Signed at Chicago, Illinois, this 16th day of January, 1930.

EDWARD A. ROCKWELL.